A. W. LOZIER.
Hay Rake and Loader.
No. 91,243. Patented June 15, 1869.
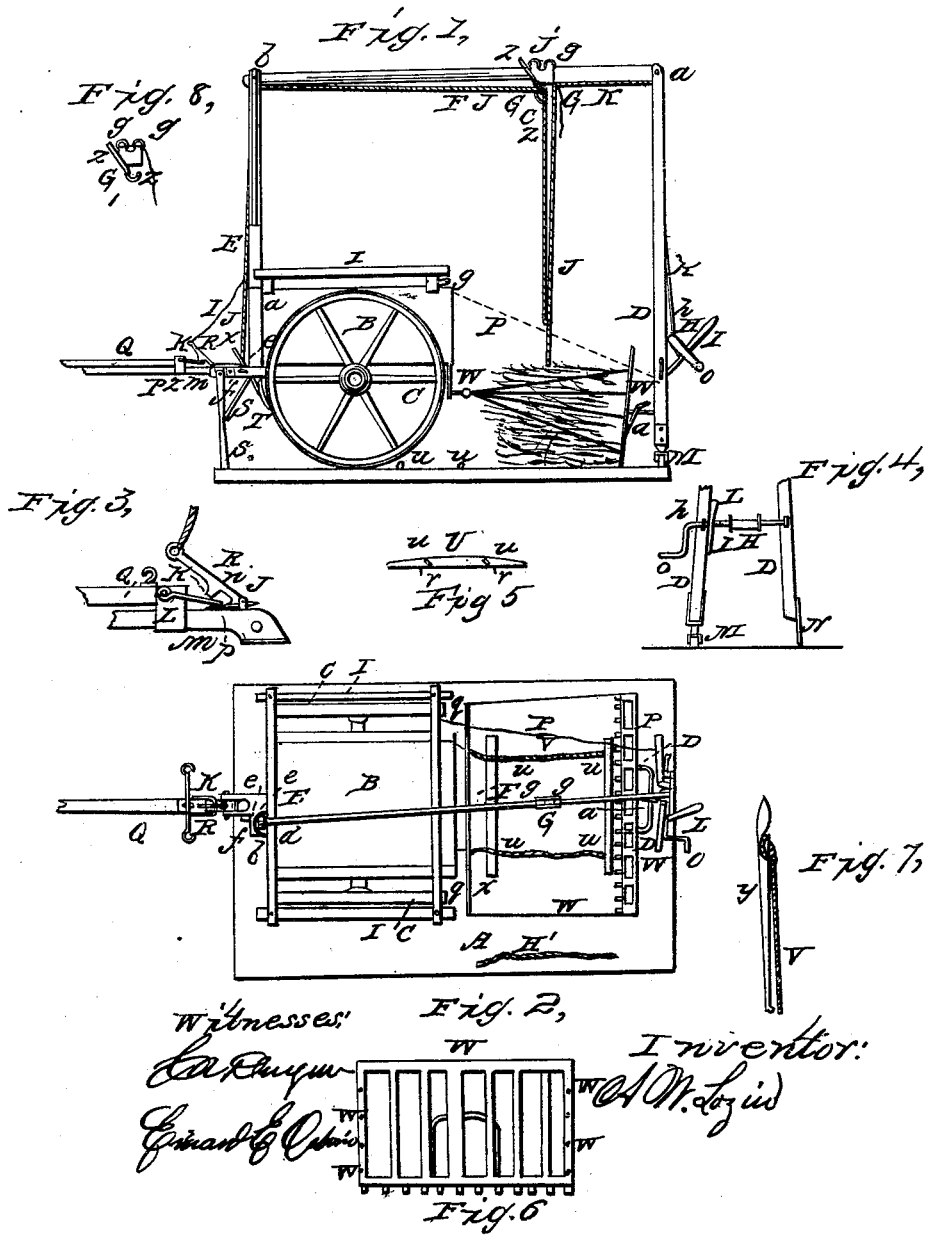

United States Patent Office.

ABRAHAM W. LOZIER, OF NEW YORK, N. Y.

Letters Patent, No. 91,243, dated June 15, 1869.

---

IMPROVEMENT IN HAY-RAKERS AND LOADERS.

---

The Schedule referred to in these Letters Patent and making part of the same.

---

*To all whom it may concern:*

Be it known that I, ABRAHAM W. LOZIER, of the city, county, and State of New York, have invented certain new and useful Improvements in Machines for Loading Hay and Grain; and I do hereby declare the following to be a full, clear, and exact description of the construction and operation of the same, reference being had to the accompanying drawings, in which—

Figure 1 is a side elevation of the apparatus.

Figure 2, a top view of the same.

Figures 3, 4, 5, 6, 7, and 8, parts in detail.

Similar letters of reference indicate like parts in the several drawings.

My invention consists in a novel manner of constructing and using a derrick, attached to and used with the carriage; and also in the devices used in connection with the derrick, which co-operate therewith, to enable the operation of loading the hay, or other substance to be greatly facilitated, and the hard labor incident thereto considerably diminished, as will be fully explained hereafter.

To enable others skilled in the art to make and use my invention, I will describe the construction and operation of the same.

The post E, which supports one end of the beam F, is secured to the front of the wagon B, by its end being held by a circular plate, e, which forms a socket therefor, and by a curved clasp d.

The front end of the beam F is pivoted to this upright by the bolt b, while the other end is secured to and supported by the shears D D.

The ends of these shears are provided with rollers M N, and a winch H, on which the rope K, which controls the travelling-pulley G, is wound.

The winch is operated by the handle O, and is governed by the brake L. It is so arranged as to be readily removed from the shears, to allow them to be folded up when desired.

To the front of the wagon is secured a sliding tongue, Q, which is so arranged that when used in connection with the loading-apparatus, the horses attached to the wagon may be used to elevate the load without being detached from the tongue.

It consists of an upper tongue, Q, to which the yoke and whiffletrees are secured, arranged to slide on a lower tongue, P, bolted to the wagon-body, and provided with a tripping-mechanism, consisting of the lever R, pivoted on the lower tongue at $j$, the locking-link $k$, pivoted to the end of the upper tongue, the tooth $m$, and the projections $n$ $o$ of the tripping-lever, as clearly shown in fig. 3 of the drawings.

When this tongue is used on the wagon, the end of the hoist-rope which passes through the pulley $t$ on the brake-lever, is fastened to the sliding tongue, so that when the catch is released, by pulling the cord $r$, the horses will raise the load by walking forward the length of the tongue, and also apply the brake T to the wheels.

A separate team may also be used to raise the load when it may not be desirable to use the sliding tongue, or the load may be raised by hand-power, by employing the clutch Z, on the travelling-pulley G, to hold the load when raised, and attaching the hoist-rope directly to the winch H, the pulley G being reversed.

To the rear end of the wagon-body, B, is attached a rake, or sweep, W, which gathers the hay as the wagon is drawn along, and brings the mass into place over the ropes V, which have been placed in the required position in front of the wagon.

The ropes are held in position temporarily by being passed through the hooks $u$ $u$, of the sills U U, which are provided with pins $r$ $r$, on the under side, to be driven into the ground.

The hooks $u'$ $u'$ may also be used in place of the above, or the baling-ropes may be passed under the mass of hay, by means of the needle Y, fig. 7.

When the load is being raised, the standard S is allowed to drop down and rest on the ground A, so as to remove the strain upon the forward end of the wagon.

The shears D are drawn along, as the wagon advances, by the guy-ropes $p$.

The sweep W can be pivoted to the front of any horse-rake, for bringing up hay to the wagon, in loading from cocks.

Operation.

The wagon, and the apparatus attached thereto, are drawn along until a sufficient quantity of hay or grain has been gathered and brought into position over the baling-ropes. V V, previously placed on the ground, in the manner above described, or passed under the mass by means of the needle Y. The ropes are then tied round the hay, and connection made with the bale and the hoisting-tackle. Power is then applied to the hoist-rope, and the load is elevated to the beam F.

The load is then drawn along on the beam of the derrick, as the rope K is allowed to unwind from the winch H, until it has arrived at the position to be lowered on the wagon, when the power is removed, and the bale permitted to drop on the wagon.

In loading stooks of corn and the like, the derrick may be held out to travel and work at the side of the carriage.

Having thus fully described my invention,

What I claim, and desire to secure by Letters Patent, is—

1. The construction and arrangement of the upright E, the beam F, and the shears D D, in combination with the carriage, substantially as described and for the purposes specified.

2. The combination, with the rake or sweep W, of the sweep-ropes $w$, for collecting the hay in bundles, substantially as described and specified.

3. The combination, with the frame D E F, of the rake or sweep, and sweep-lines, substantially as described and specified.

4. The open-eyed needle Y, for thrusting the baling-ropes, or sling, under the hay, constructed and operating substantially as described and specified.

A. W. LOZIER.

Witnesses:
C. A. DURGIN,
EDWARD E. OSBORN.